United States Patent [19]

Lockett et al.

[11] Patent Number: 4,490,606
[45] Date of Patent: Dec. 25, 1984

[54] TRANSDUCER APPARATUS UTILIZING FIBER OPTICS FOR DATA TRANSMISSION

[75] Inventors: James F. Lockett, Missouri City; Miles A. Smither, Houston; Jerry F. Janecka, Corpus Christi, all of Tex.

[73] Assignee: Geosource Inc., Houston, Tex.

[21] Appl. No.: 371,782

[22] Filed: Apr. 26, 1982

[51] Int. Cl.³ .............................................. G02B 5/14
[52] U.S. Cl. ................. 250/227; 250/231 R; 73/728; 455/612
[58] Field of Search ............... 250/227, 231 R, 231 P; 73/705, 728; 455/605, 606, 607, 610, 612

[56] References Cited

U.S. PATENT DOCUMENTS

| 4,156,809 | 5/1979 | Phillips | 250/227 |
| 4,346,478 | 8/1982 | Sichling | 455/605 |
| 4,417,140 | 11/1983 | Adolfsson et al. | 250/227 |

OTHER PUBLICATIONS

McGowan, "Multiple Pressure Transmitters Speak Digital on Two Wires", Control Engineering, Dec., 1979.
"Smoke Alarm uses Fiber Optics for Hazardous Areas" Electronic Design, Sep., 1981, p. 64.

Primary Examiner—David C. Nelms
Attorney, Agent, or Firm—Arnold, White & Durkee

[57] ABSTRACT

A transducer apparatus utilizing fiber optics for data transmission is disclosed in which an output optical signal is encoded with information representative of a parameter being measured and the encoded optical signal transmitted to a remote measurement and control apparatus site for decoding. The transducer is adapted to receive an input optical signal, and converts the input optical signal into electrical energy to power a driver. An electrical drive signal, generated by the driver, has a selectively variable frequency representative of the parameter being measured. Using the electrical drive signal, the output optical signal is generated. The driver includes a variable frequency oscillator whose frequency of oscillation is dependent upon the parameter being measured.

10 Claims, 4 Drawing Figures

U.S. Patent    Dec. 25, 1984    4,490,606
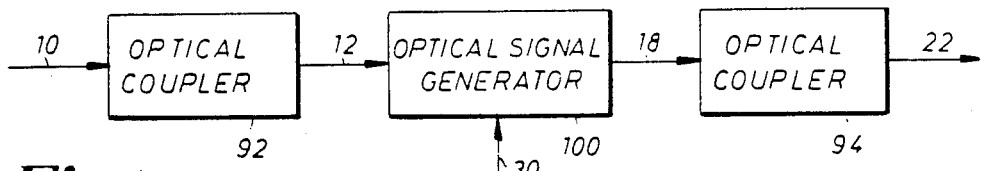
Fig.1
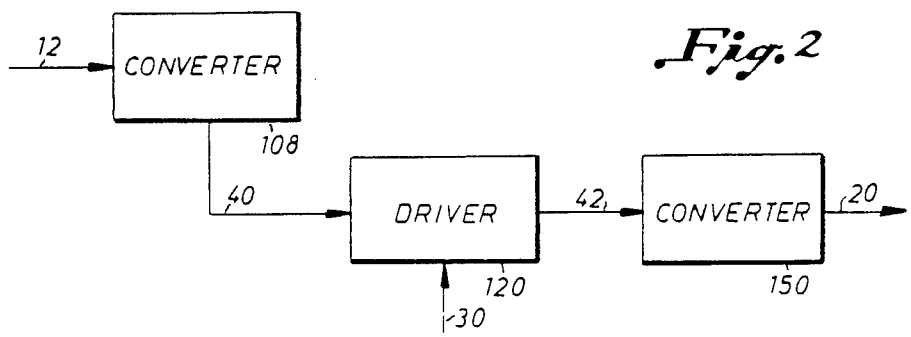
Fig.2
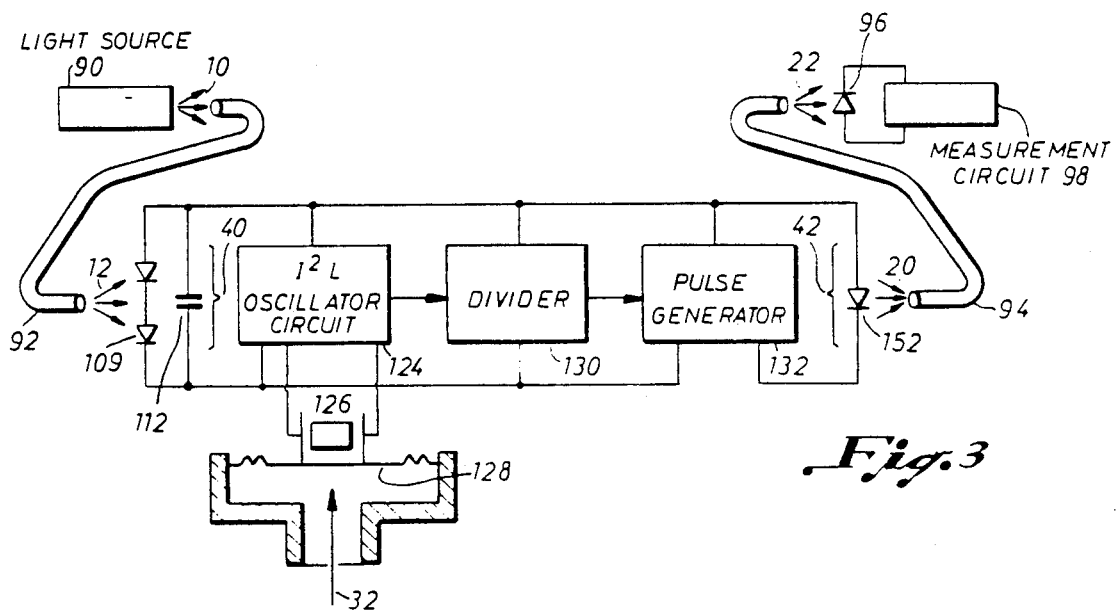
Fig.3
Fig.4
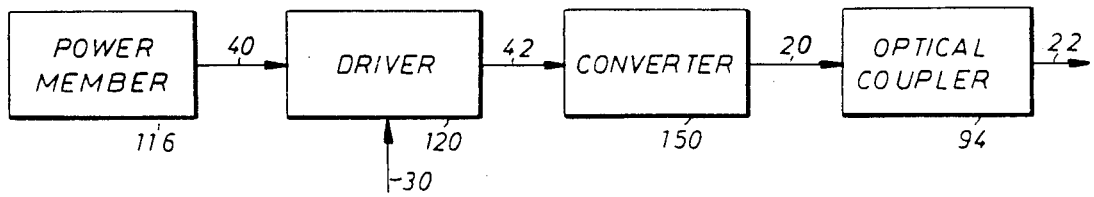

TRANSDUCER APPARATUS UTILIZING FIBER OPTICS FOR DATA TRANSMISSION

CROSS REFERENCE TO RELATED APPLICATIONS

Passive Transducer Using Fiber Optics for Data Transmission, Ser. No. 371,830, filed on Apr. 26, 1982 invented by James F. Lockett, Jerry F. Janecka, Thomas O. Mehrkam, William F. Wiseman and Robert L. Remels and assigned to the assignee of the present application; Transducer for Optical Data Transmission, Ser. No. 371,951, filed on Apr. 26, 1982, invented by James F. Lockett, Jerry F. Janecka and Thomas O. Mehrkam and assigned to the assignee of the present application.

BACKGROUND OF THE INVENTION

This invention relates generally to transducers, and more particularly to a transducer which utilizes fiber optics for data transmission.

Physical parameters, such as temperature, pressure, force, stress, displacement, flow, and so forth, are utilized daily for monitor and control of processes. To monitor such parameters, transducers have generally been used to transform the parameter to be measured into an electrical signal, and the resulting electrical signal transmitted over electrical wires from the point of measurement to a second point at which measurement and control apparatus are located. And, in most instances, electrical power to operate the transducer is brought to the point of measurement from the measurement and control apparatus location over electrical wires.

Such systems, however, are susceptible to numerous problems when used in hostile or explosive environments. For example, the electrical wires used to transmit the electrical signal representative of the parameter from the transducer to the measurement and control apparatus location, and the electrical wires used to transmit electrical power to the transducer from the measurement and control apparatus location are susceptible to electromagnetic interference. Such electromagnetic interference can produce undesired impulses on the electrical wires which can result in transmission of incorrect data. Additionally, shorting due to insulation failure and the like can result in explosion caused by generation of an electric arc in the explosive environment, or by heating an element past the flash-point of the explosive environment.

SUMMARY OF THE INVENTION

According to a preferred embodiment of the present invention, an optical signal representative of the parameter to be measured is produced by the transducer, and the optical signal is then transmitted from the transducer to the remote measurement and control apparatus site. Electrical power may be supplied to the transducer by an optical input signal transmitted to the transducer from the remote site, thereby eliminating all electrical wire connections between the transducer and the remote measurement and control apparatus site.

According to one preferred embodiment of the present invention, an input optical signal transmitted from the remote measurement and control apparatus site is received at the transducer and converted into an electrical signal for powering the transducer. So powered, the transducer generates an electrical drive signal representative of the parameter being measured. The electrical drive signal is then converted into an optical signal representative of the parameter, and this optical signal transmitted back to the remote site.

BRIEF DESCRIPTION OF THE DRAWINGS

The preferred embodiments of the present invention are described with reference to the accompanying drawings wherein like members bear like reference numerals, and wherein:

FIG. 1 is a block diagram of a transducer according to the present invention;

FIG. 2 is a block diagram of an optical signal generator for the transducer illustrated in FIG. 1;

FIG. 3 is an illustration of a measurement system having a transducer with an optical signal generator as illustrated in FIG. 2; and FIG. 4 is a block diagram of a transducer according to one embodiment of the present invention.

DESCRIPTION OF THE PREFERRED EMBODIMENTS

Referring to FIG. 1, a transducer apparatus includes an optical coupler 92 which receives an input optical signal 10 and transmits an optical signal 12. Optical signal generator 100 receives optical signal 12 and generates modulated optical signal 18 in such a manner that the modulated optical signal is representative of a parameter 30 that is monitored by modulator 100. The modulated optical signal is received by optical coupler 94 which in turn transmits optical output signal 22 from the transducer.

FIG. 2 illustrates the optical signal generator 100 in block diagram form. Referring to FIG. 2, optical signal 12 is received by converter 108 which converts the optical signal into a first electrical signal 40. The electrical signal 40 is used to power a driver 120 which monitors parameter 30 and generates an electrical drive signal 42 representative of the parameter. Electrical drive signal 42 drives a converter 150 which produces generated optical signal 20, the generated optical signal being representative of parameter 30.

FIG. 3 illustrates a measurement system having a transducer as illustrated in FIG. 2. Light source 90, photodiode 96, and measurement circuit 98 are located at a remote measurement and control apparatus site. Input optical signal 10, generated by light source 90, is transmitted to the transducer by optical fiber 92. Optical signal 12 impinges on photovoltaic cells 109 which, in turn, produce a first electrical signal 40 across capacitor 112. The first electrical signal is used to power integrated injection logic (I$^2$L) oscillator circuit 124, as well as optional divider 130 and optional pulse generator 132.

Oscillator circuit 124 is preferably a variable frequency oscillator whose frequency of oscillation is controlled by crystal 126. The crystal is disposed with respect to a moving mechanical member 128 such that pressure 32, the parameter being measured, inpinges upon member 128. In turn, member 128 inflicts a force upon crystal 126 thereby changing the frequency at which the crystal oscillates proportionally to applied pressure 32. Alternatively, any circuit component which can be used to vary the frequency of the oscillator, for example a resistance element, an inductive element, or a capacitive element, may be used in place of crystal 126. When a parameter other than pressure is being monitored, the particular parameter is inflicted upon the variable circuit element in such a manner that the oscillator circuit frequency is varied in response to the parameter.

Preferably, the crystal should be fairly low frequency, for example approximately 10 kHz. The output of oscillator circuit 124 may be used to directly drive light emitting diode (LED) 152. Alternatively, the frequency of the output signal from oscillator circuit 124 may be reduced by a divider 130 and the output of the divider coupled to pulse generator 132 which, in turn, produces the electrical drive signal for LED 152.

Light emitting diode 152 is thus driven by an electrical signal which is a function of the parameter being measured. Consequently, the light produced by LED 152, generated optical signal 20, is representative of the parameter measured. The generated optical signal is transmitted to the remote site over optical fiber 94. At the remote site, output optical signal 22 is measured by photodiode 96 and measurement circuit 98.

The oscillator circuit 124 may comprise any suitable oscillator circuit, for example, a complimentary metal oxide semiconductor (CMOS) oscillator or an I$^2$L oscillator. The latter, however, is preferred since an I$^2$L oscillator works on a lower voltage than a CMOS oscillator.

In the embodiment illustrated in FIG. 3, the capacitor 112 is used to provide LED current during LED pulsing. The LED is pulsed with short pulses approximately 1 microsecond in duration. Advantageously, the crystal frequency of the embodiment illustrated in FIG. 3 may be approximately 16 kHz and the divider 130 may divide by $2^{10}$. And, as will be apparent to those skilled in the art, photovoltaic cells 109 and LED 152 may be disposed in a single array and a single optical fiber used in place of optical fibers 92, 94.

In still another embodiment of the present invention a battery or other suitable electrical storage device may be included in the transducer thereby eliminating the need for converting any of the optical signal received by the transducer into a first electrical signal to power the transducer. The battery may advantageously be charged by a solar cell. Referring to FIG. 4, one such embodiment includes only one optical coupler, optical coupler 94, because no input optical signal need be transmitted to the transducer. Such a transducer includes a battery or other suitable power member 116 which is self-contained at the location of the transducer and which produces the first electrical signal 40 used to power driver 120. The remaining portions of the circuit illustrated in FIG. 4 perform identically as previously described.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A transducer adapted to receive an input optical signal and responsive to a predetermined parameter which is to be measured, for generating an output optical signal in a dependence to said parameter, said transducer comprising:

a first optical coupling means having a first end for receiving said input optical signal and a second end for transmitting said input optical signal;

first conversion means optically coupled to said second end of said first optical coupling means for receiving said input optical signal and for generating an electrical power signal;

driver means powered by said electrical power signal and responsive to said predetermined parameter for generating an electrical drive signal representative of said predetermined parameter, said driver means including:

oscillator circuit means having a selectively variable frequency of oscillation for producing an oscillatory signal;

frequency varying means responsive to said predetermined parameter for selectively varying the frequency of oscillation of said oscillator circuit means to selectively vary said oscillatory signal in dependence on said parameter; and output means connected to receive said oscillatory signal for providing said electrical drive signal in dependence on said oscillatory signal;

second conversion means connected to receive said electrical drive signal for generating said output optical signal in dependence on said electrical drive signal; and second optical coupling means having a first end for receiving said output optical signal and a second end for transmitting said output optical signal.

2. The transducer according to claim 1 wherein said output means includes a divider.

3. The transducer according to claim 2 wherein said output means further includes a pulse generator.

4. The transducer according to claim 1 wherein said oscillator circuit means includes an integrated injection logic oscillator circuit.

5. The transducer according to claim 1 wherein said frequency varying means includes a crystal member.

6. the transducer according to claim 1 wherein said frequency varying means includes a resistance element.

7. the transducer according to claim 1 wherein said frequency varying means includes an inductive element.

8. The transducer according to claim 1 wherein said frequency varying means includes a capacitive element.

9. The transducer according to claim 1 wherein said first conversion means includes a photovoltaic cell, and said second conversion means includes a light emitting diode.

10. The transducer according to claim 1 wherein said first and second optical coupling means each comprise an optical fiber.

* * * * *